United States Patent
Mariblanca-Nieves et al.

(10) Patent No.: US 9,154,360 B2
(45) Date of Patent: Oct. 6, 2015

(54) METHOD, SYSTEM AND APPARATUS FOR HANDLING TERMINAL CAPABILITIES

(75) Inventors: David Mariblanca-Nieves, Madrid (ES); Juan Antonio Sanchez-Herrero, Madrid (ES); Felix Javier Garcia Visiedo, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1625 days.

(21) Appl. No.: 10/453,260

(22) Filed: Jun. 2, 2003

(65) Prior Publication Data
US 2003/0233461 A1   Dec. 18, 2003

(30) Foreign Application Priority Data
Jun. 12, 2002   (EP) ..................................... 02077319

(51) Int. Cl.
| | |
|---|---|
| G06F 15/16 | (2006.01) |
| H04L 29/06 | (2006.01) |
| H04L 29/08 | (2006.01) |
| H04M 3/42 | (2006.01) |
| H04W 8/18 | (2009.01) |

(52) U.S. Cl.
CPC .............. *H04L 29/06* (2013.01); *H04L 67/303* (2013.01); *H04L 67/306* (2013.01); *H04L 67/42* (2013.01); *H04M 3/42229* (2013.01); *H04W 8/18* (2013.01)

(58) Field of Classification Search
USPC ........................................................ 709/228
See application file for complete search history.

(56) References Cited

U.S. PATENT DOCUMENTS

| | | | | |
|---|---|---|---|---|
| 5,941,955 A | * | 8/1999 | Wilby et al. ................... | 709/242 |
| 6,035,339 A | * | 3/2000 | Agraharam et al. ........... | 709/246 |
| 6,161,008 A | * | 12/2000 | Lee et al. ....................... | 455/415 |
| 6,275,692 B1 | * | 8/2001 | Skog ........................... | 455/414.3 |
| 6,782,425 B1 | * | 8/2004 | Germscheid et al. .......... | 709/227 |
| 6,859,649 B1 | * | 2/2005 | Denenberg et al. ............ | 455/406 |
| 6,915,345 B1 | * | 7/2005 | Tummala et al. .............. | 709/225 |
| 6,959,009 B2 | * | 10/2005 | Asokan et al. ................. | 370/475 |
| 7,006,242 B2 | * | 2/2006 | Smith et al. ................... | 358/1.15 |

(Continued)

FOREIGN PATENT DOCUMENTS

| | | |
|---|---|---|
| EP | 0685972 A3 | 12/1995 |
| WO | 9941931 A1 | 8/1999 |

OTHER PUBLICATIONS

Yalun Li, et al., A Framework for Universal Personal Computing, Universal Personal Communications, 1996 5th IEEE International Conference on Cambridge, MA, Sep. 29, 1996, pp. 769-773, New York, NY.

Primary Examiner — Mohamed Ibrahim

(57) ABSTRACT

The present invention relates to telecommunication systems providing multiple services which could require possible adaptations based on the capabilities of the terminal used to access those services.
Master databases in the telecommunication system take the responsibility to map between terminal and user identifiers. Applications and services are thus able to query terminal related capability information based on a user identity.
In accordance with the invention, a Terminal Capabilities database (TC-DB) is introduced in order to establish a temporary relationship between a user and a terminal operated by such user. When a user attaches to the network, a terminal identifier is sent to the network that forwards that identity to the TC-DB. For retrieval of terminal capabilities the application servers send a request message to the TC-DB by using the user identity as a correlating key.

31 Claims, 6 Drawing Sheets

(56) References Cited

U.S. PATENT DOCUMENTS

| | | | |
|---|---|---|---|
| 7,139,797 B1* | 11/2006 | Yoakum et al. | 709/204 |
| 7,216,294 B2* | 5/2007 | Gibbs et al. | 715/235 |
| 7,269,664 B2* | 9/2007 | Hutsch et al. | 709/246 |
| 7,380,250 B2* | 5/2008 | Schechter et al. | 719/328 |
| 2001/0034771 A1* | 10/2001 | Hutsch et al. | 709/217 |
| 2002/0044634 A1 | 4/2002 | Rooke et al. | |
| 2002/0099799 A1* | 7/2002 | Kolsky | 709/219 |
| 2002/0110230 A1* | 8/2002 | Leuca et al. | 379/201.01 |
| 2002/0113994 A1* | 8/2002 | Smith et al. | 358/1.15 |
| 2002/0120873 A1* | 8/2002 | Salmivalli | 713/201 |
| 2002/0147845 A1* | 10/2002 | Sanchez-Herrero et al. | 709/245 |
| 2003/0009567 A1* | 1/2003 | Farouk | 709/229 |
| 2003/0027581 A1* | 2/2003 | Jokinen et al. | 455/456 |
| 2003/0121983 A1* | 7/2003 | Herle | 235/472.01 |
| 2003/0130864 A1* | 7/2003 | Ho et al. | 705/1 |
| 2003/0200285 A1* | 10/2003 | Hansen et al. | 709/220 |
| 2003/0227927 A1* | 12/2003 | Chow et al. | 370/400 |
| 2004/0024867 A1* | 2/2004 | Kjellberg | 709/224 |
| 2004/0205561 A1* | 10/2004 | Gibbs et al. | 715/513 |
| 2005/0169204 A1* | 8/2005 | Haumont et al. | 370/312 |
| 2009/0287837 A1* | 11/2009 | Felsher | 709/229 |

* cited by examiner

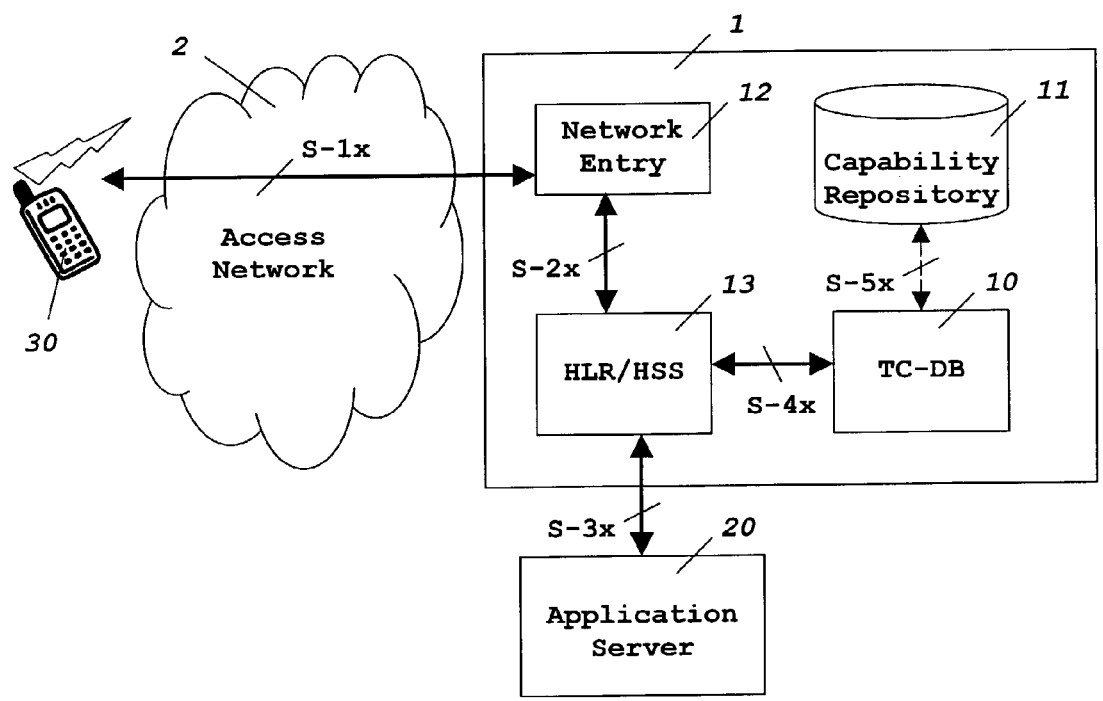
FIG.-1-

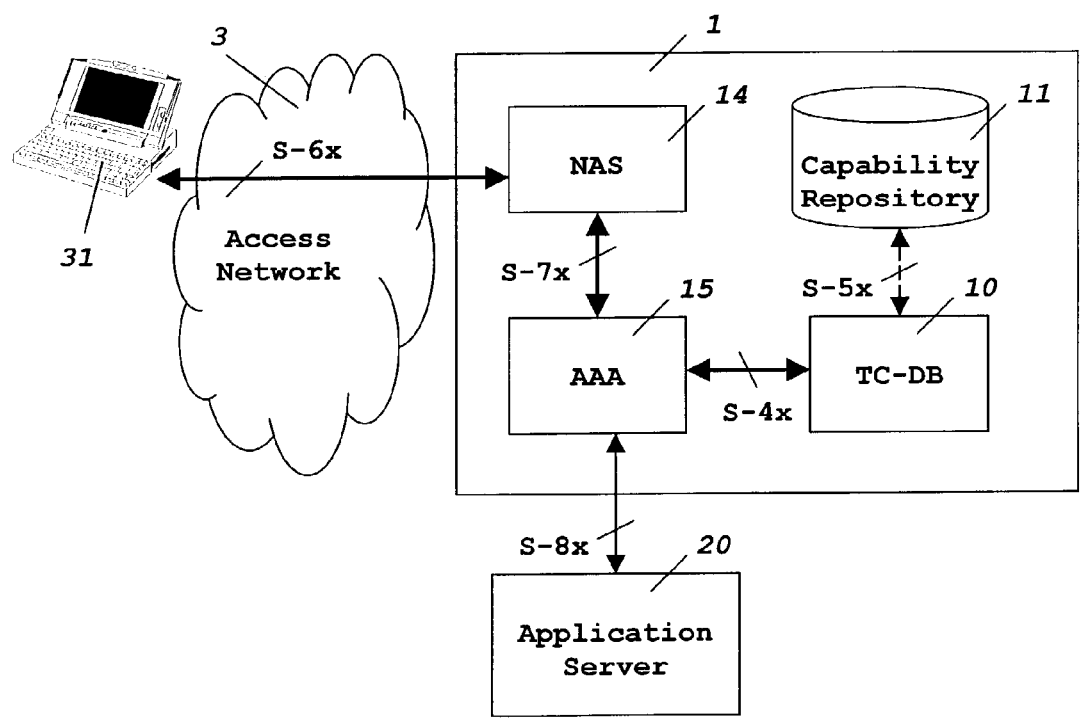
FIG.-2-

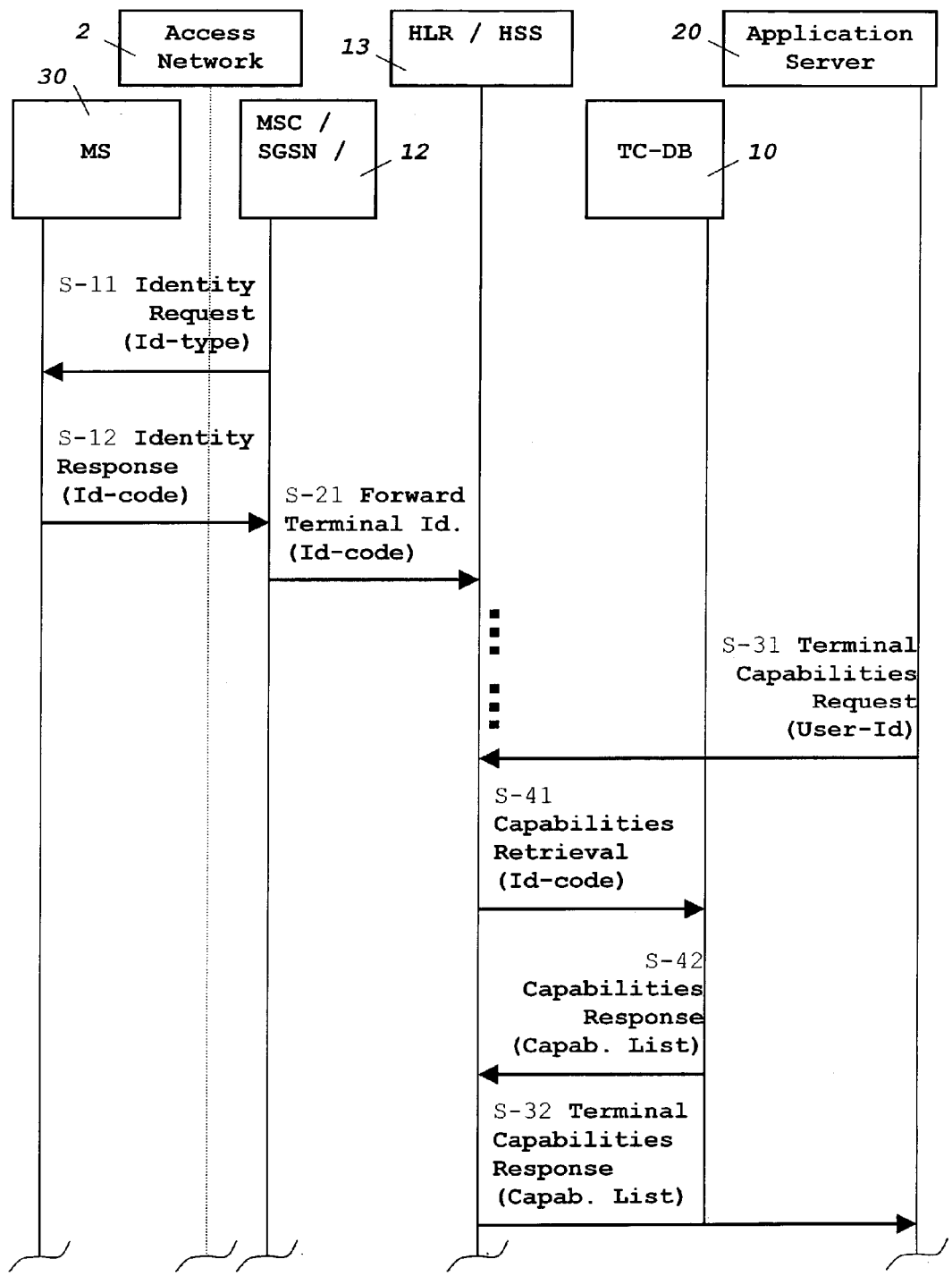
FIG.-3-

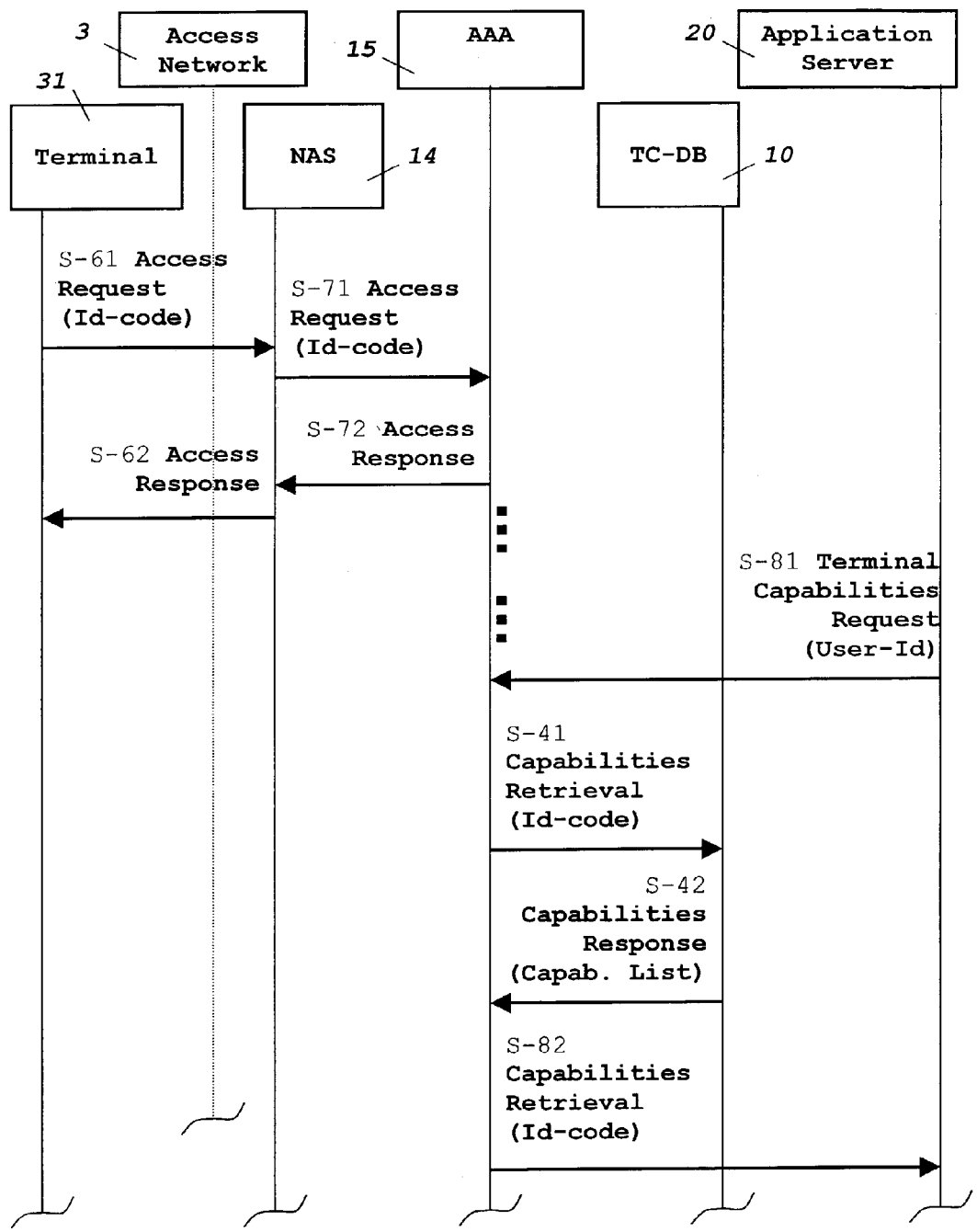
FIG.-4-

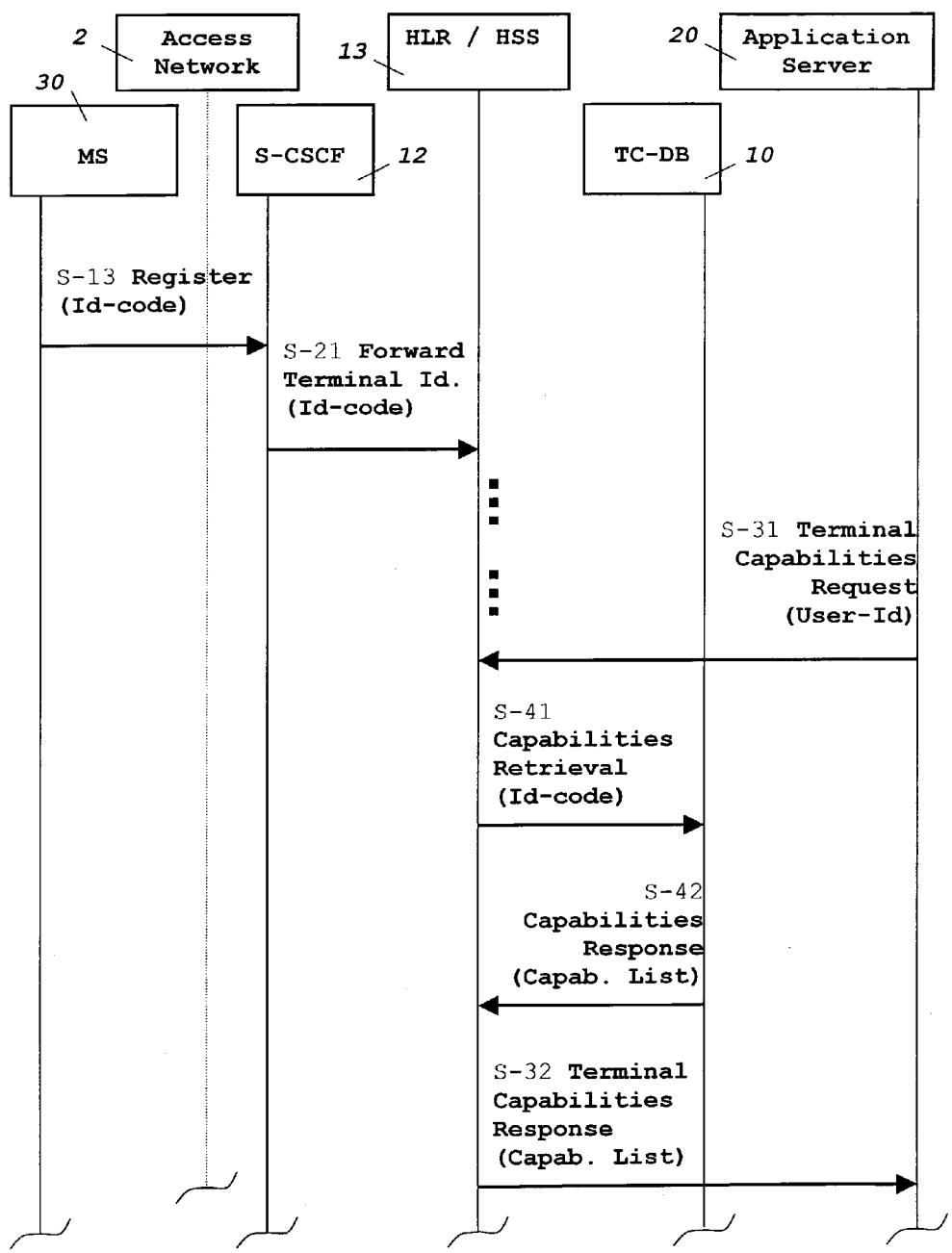
FIG.-5-

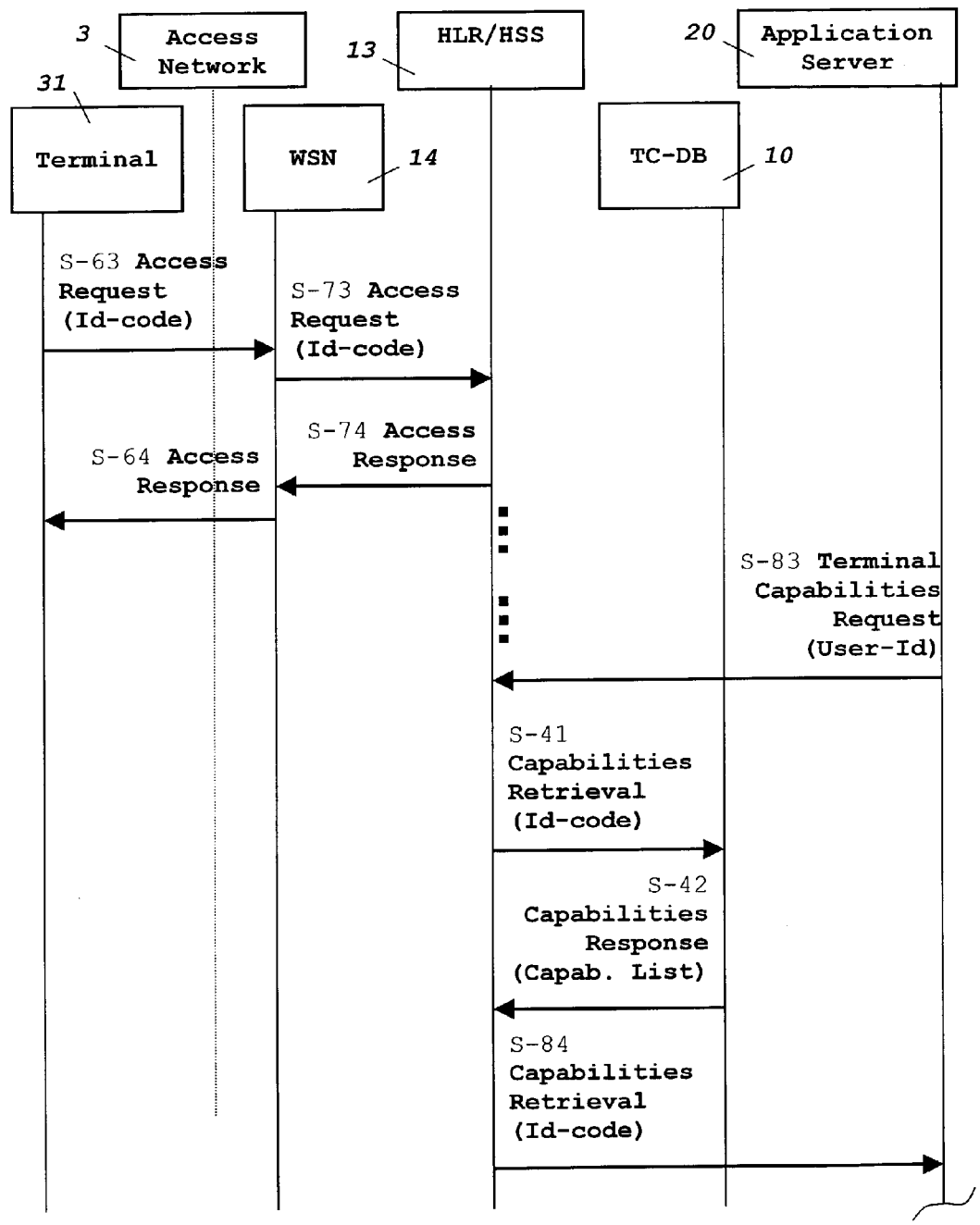
FIG.-6-

METHOD, SYSTEM AND APPARATUS FOR HANDLING TERMINAL CAPABILITIES

This application claims the benefit of the filing date as provided in 35 U.S.C. 119 of European patent application number 02077319-8 on Jun. 12, 2002, the disclosure of which is incorporated herein by reference.

FIELD OF THE INVENTION

The present invention relates to telecommunication systems providing multiple services that may require possible adaptations depending on the capabilities of the terminal that an end-user is making use of at a certain time.

BACKGROUND OF THE INVENTION

With the introduction of new network technologies, the spreading of services and applications grows in number and complexity. On the other hand, mobile devices supplied by different manufacturers are expected to be more and more divergent in performance, input and output capabilities, network connectivity, processing power, and many other capabilities.

As a result of this device heterogeneity, client devices may receive contents from different applications and services, that they cannot store, that they cannot display, or that it takes too long to deliver over the supported network technology.

Some applications and services need to know characteristics of the terminal used to access the network in order to be able to adapt contents and services to the capabilities of the user terminal, thus improving end-user satisfaction and optimizing network resources.

The standardization body for Wireless Application Protocol (WAP), which is generally known as the WAP Forum, specifies a mechanism incorporated in the WAP2.0 technical specification to enable an end-to-end flow of a User Agent Profile (hereinafter UAProf) between a WAP client, intermediate network points, and an originating server. This User Agent Profile includes a set of terminal capabilities information. Heretofore, this is a partial solution to the problem of letting the applications and services know about terminal capabilities, since it is only valid for WAP applications and WAP terminals. However, UAProf proposes an end-to-end negotiation of terminal capabilities between the application server and the mobile terminal, thus increasing traffic load and latency time whenever a new service is accessed.

In addition, the new Mobile Execution Environment (hereinafter MExE) specification within the $3^{rd}$ Generation Partnership Project (3GPP) describes an application environment for the latest generations of mobile devices. This MExE comprises a variety of current technologies and incorporates both WAP and Java, including also a framework which specifies, among others, capabilities and contents negotiation.

Different technologies follow different mechanisms in order to provide those applications running on top of such technologies with terminal capabilities information intended for adapting contents to particular terminals. That is the case of both WAP and MExE above. The use of UAProf, for instance, is widely spread around these technologies, and generally accepted as a convenient solution to the problem of representing and exchanging terminal capabilities information. Other suitable mechanism under WAP or MExE is the so-called Composite Capability Preference Profiles (CC/PP), which is an application of the extensible Mark-up Language (XML) used to describe capabilities and preferences associated with a user, and the agents used by a user to access the network. These user agents include the hardware platform, system software and applications used by the user. User agent capabilities and references can be thought as meta data or properties, and descriptions of the user agent hardware and software.

Despite the current trends of using solutions based on UAProf or CC/PP, these technologies above implement such solutions in a proprietary manner, making each solution incompatible with the others. Moreover, these solutions propose that a dialog for negotiating terminal capabilities is directly established between the terminal and each application server, making it necessary to the terminal the sending of such terminal capabilities to any new application server that the user wants to make use of. This leads to an unnecessary increment of traffic from terminal equipment to application servers and consequently to an increase on the latency time when accessing a service, what is more significant in a mobile environment.

In addition to this, the terminal equipment has to implement a new protocol for negotiation of terminal capabilities for every different technology. In other words, a terminal equipment implementing WAP and MExE has to implement UAProf and/or CC/PP for WAP and for MExE.

The international application WO 99/41931 describes a mechanism for an application server to deal with terminal capabilities. This application proposes a peer-to-peer mechanism between the terminal and the server to let the server know the terminal identifier by using an Unstructured Supplementary Service Data (USSD) message included in the Mobile Application Part (MAP) protocol. The server assumes the responsibility to look for terminal capabilities outside the mobile network and based on said terminal identifier. Thus, the establishment of a relation between the user identity and the terminal identifier is not solved. Terminal capabilities information is related in no way with the rest of the user profile, forcing the application server to use different mechanisms to access user profile and terminal capabilities.

Moreover, the European application EP 1 051 054 describes a mechanism for allowing the use of a service, or for adapting the service behaviour, depending on the terminal capabilities and the specific location, by accessing to certain databases tracking the mobile equipment and the geographic location. However, this mechanism only provides a reference of the equipment model to the application server, leaving to the application the responsibility of obtaining the specific terminal capabilities. Moreover, the invention does not solve the establishment of relations between the user identity and the terminal equipment identifier.

SUMMARY OF THE INVENTION

None of the patent applications or standardization bodies above provides for a telecommunication network based solution where the terminal capabilities of a terminal equipment, which is currently in use by a user, can be directly obtained by any application server from said telecommunication network by simply making use of the user identity.

It is therefore an object of the present invention the provision of a telecommunication network based solution where the terminal capabilities of a terminal equipment, which is currently in use by a user, can be directly obtained from the telecommunication network by any application server running on top of said telecommunication network by simply making use of the user identity.

It is a further object of the present invention to relate the terminal capabilities of said terminal equipment with the user profile data for the user currently making use of such terminal equipment.

The objects above are accomplished by the present invention with a method, a system and apparatus for providing capabilities of a terminal equipment operated by a user in a telecommunication system to an application server intended for offering services to said user through such terminal equipment.

The method comprising the steps of: storing in the telecommunication system capabilities of at least one of a plurality of terminal equipment; establishing a temporary relationship between the user operating a terminal equipment and the capabilities of said terminal equipment; and providing capabilities of the terminal equipment currently in use by the given user, from the telecommunication system to an application server.

In accordance with this method, the step of storing terminal capabilities in the telecommunication system includes a step of correlating capabilities of each terminal equipment with an identifier of said terminal equipment.

Also according to this method, the establishment of a temporary relationship between user and terminal equipment comprises the steps of: sending from the terminal equipment toward the telecommunication system an identifier of said terminal equipment along with the user identity; receiving the user identity and the current terminal equipment identifier at an entity holding user profile data in the telecommunication system; and linking user profile data, user identity and terminal equipment identifier.

An advantageous use of this method is the provision of capabilities of a terminal operated by a given user at request from an application server. Such mechanism comprises the steps of: requesting from an application server to a telecommunication network, by providing the user identity, the capabilities of the terminal operated by the given user; obtaining at an entity that holds user profile data in the telecommunication network the terminal equipment identifier linked to said user identity; fetching from storage the list of capabilities stored for such terminal equipment identifier; and responding to the application server from the telecommunication network with the list of capabilities requested.

There is also proposed a telecommunication system in accordance with the invention for providing capabilities of a terminal equipment operated by a user to an application server intended for offering services to said user through such terminal equipment.

This telecommunication system comprising: means for storing capabilities of at least one of a plurality of terminal equipment; means for establishing a temporary relationship between the user operating a terminal equipment and the capabilities of said terminal equipment; and means for providing capabilities of a terminal equipment currently in use by a given user to the application server.

Therefore, the telecommunication system further includes: means for receiving a user identity and a terminal equipment identifier of the terminal currently operated by said user; and means for linking user profile data, user identity and terminal equipment identifier; both means preferably located at an entity holding user profile data in the telecommunication system.

More specifically and directly addressed to objects of the invention, the telecommunication system also comprises: means for receiving a request from an application server for providing the capabilities of a terminal equipment, the request including the user identity of the user operating said terminal equipment; means for obtaining the terminal equipment identifier linked to said user identity; means for fetching from storage the list of capabilities stored for such terminal equipment identifier; and means for responding to the application server with the list of capabilities requested for the indicated user identity.

The telecommunication network in accordance with the invention may receive through an entry node the terminal equipment identifier and the user identity sent from the terminal equipment. This entry node likely interposed between the terminal and another entity holding user profile data in the telecommunication network. In this case, such telecommunication network entry node transfers the received terminal equipment identifier and user identity to said entity holding user profile data.

In particular, the network entity holding user profile data may be a Home Location Register (HLR), or a Home Subscriber Server (HSS) whereas the entry node may be a Mobile Switching Center (MSC), or a Serving GPRS Support Node (SGSN). Under this scenario, the terminal equipment identifier and the user identity may be both included in an Update Location message. However, the entry node to the telecommunication network may be a Call Status Control Function (CSCF) as well, where the terminal equipment identifier and the user identity may be both included in an Cx-put message.

Also in particular, the network entity holding user profile data, and thus receiving the terminal equipment identifier and the user identity, may be an Authentication Authorization and Accounting (AAA) server. Such network entity may be accessed at the telecommunication network via a Network Access Server (NAS) or a WLAN Support Node (WSN) acting as network entry node. Under this scenario, the terminal equipment identifier and the user identity are both included in a message intended for Access Request from the entry node to the entity holding user profile data.

In accordance with the invention, user profile data, user identity and terminal equipment identifier are linked on a per user basis in a Home Location Register (HLR), or in a Home Subscriber Server (HSS), or in an Authentication Authorization and Accounting (AAA) server.

In addition, the invention proposes a Terminal Capabilities Database where user identities and terminal equipment identifiers are linked on a per user basis. Then, terminal capabilities are stored in a storage accessible to said Terminal Capabilities Database and correlated therein with a terminal equipment identifier.

Detailed preferred embodiments are further described wherein an application server requests to a Home Location Register (HLR), or a Home Subscriber Server (HSS), or an Authentication Authorization and Accounting (AAA) server the terminal capabilities of a terminal equipment by providing the user identity of the user operating said terminal equipment. Then, a list of terminal capabilities associated to said terminal equipment identifier is fetched from a storage accessible to the Terminal Capabilities Database.

BRIEF DESCRIPTION OF DRAWINGS

The features, objects and advantages of the invention will become apparent by reading this description in conjunction with the accompanying drawings, in which:

FIG. 1 basically represents how an application server can obtain from a telecommunication network information about the terminal capabilities of a terminal equipment currently in use by a user where the telecommunication network is a mobile network—Circuit, Packet, or IP Multimedia—or a wireless network.

FIG. 2 basically represents how an application server can obtain from a telecommunication network information about the terminal capabilities of a terminal equipment currently in use by a user accessing to services through an Internet Service Provider (ISP).

FIG. 3 shows a simplified view of the signalling flow for identifying the terminal capabilities of a terminal equipment currently in use by a user accessing the telecommunication network in FIG. 1 and the signalling flow for an application server to obtain said terminal capabilities, wherein the telecommunication network is a GSM, or GPRS network.

FIG. 4 shows a simplified view of the signalling flow for identifying the terminal capabilities of a terminal equipment currently in use by a user accessing via an Internet Service Provider as shown in FIG. 2, and the signalling flow for an application server to obtain said terminal capabilities.

FIG. 5 shows a simplified view of the signalling flow for identifying the terminal capabilities of a terminal equipment currently in use by a user accessing the telecommunication network in FIG. 1 and the signalling flow for an application server to obtain said terminal capabilities, wherein the telecommunication network is an IP Multimedia network following 3GPP standards.

FIG. 6 shows a simplified view of the signalling flow for identifying the terminal capabilities of a terminal equipment currently in use by a user accessing an Internet Service Provider through a Wireless Local Area Network (WLAN), and the signalling flow for an application server to obtain said terminal capabilities.

DETAILED DESCRIPTION OF PREFERRED EMBODIMENTS

The following describes currently preferred embodiments of means, methods and system for providing terminal capabilities of a terminal equipment, which is currently in use by a user, to any application server by simply making use of the user identity. In accordance with an aspect of the present invention, the terminal capabilities of said terminal equipment are related with the user profile data for said user currently making use of such terminal equipment.

Thus, this invention gives to any application server the possibility of getting the capabilities of the terminal being used by a certain user at any time. The application server thus performs this retrieval of capabilities in order to adapt the contents to be served to the terminal in the most suitable way. For example, if an streaming server is about sending an MPEG video to a terminal, it may be worthwhile to know if the terminal is able to display such kind of files.

Therefore, a proposed solution is depicted in FIGS. 1 and 2 for a user accessing an application server (20) through a telecommunication network (1) via a generic access network (2) or via an Internet Service Provider (3) respectively. There is provided in accordance with the invention a Terminal Capabilities Database (10) (hereinafter referred to as TC-DB) in a telecommunication network (1) in order to store a temporary relationship between the user and the terminal equipment (30, 31) that he or she is making use of.

Also, this TC-DB is in charge of storing the terminal capabilities descriptions in a predefined and well known format, by using CC/PP for example, though this latter functionality can be achieved with an external storage in addition to the TC-DB. Such optional storage is shown in FIGS. 1 and 2 as a Capability Repository (11).

When a user provided with a terminal equipment (30) attaches (S-1x) to a telecommunication network (1), as depicted in FIG. 1, the terminal identifier is sent to the network entry point (12) which forwards (S-2x) the terminal identifier to a telecommunication network database (13) where subscriber profiles reside. In particular, in a traditional $2^{nd}$ generation mobile system, said telecommunication network database is a Home Location Register (HLR) whereas in $3^{rd}$ generation mobile systems with IP Multimedia the telecommunication network database is a Home Subscriber Server (HSS). For the purpose of the present invention they are individually referred to as HLR/HSS irrespective of being given IP Multimedia or not.

This forwarding can be performed, for example, just by upgrading the existing Location Update message, which is addressed to both HLR and HSS, in order to contain such terminal identifier.

In accordance with another aspect of the present invention, the TC-DB (10) functionality may be collocated or included in a Home Location Register (HLR) or in Home Subscriber Server (HSS). An upgraded Location Update message comprising a user identity, as before, and a new data indicating the terminal identifier, is thus received at an HLR/HSS. The aforementioned temporary relationship between the user and the terminal equipment, the latter being identified by said terminal identifier, may be established at said HLR/HSS, wherein this relationship includes the whole user profile, or may be established as well at the TC-DB wherein just the indicated user identity and terminal identifier are stored.

In a first embodiment of the present invention, the HLR/HSS maintains the temporary relationship between the user identity and the terminal identifier whereas the TC-DB alone or in combination with the Capability Repository (11) merely comprises lists of capabilities on a per terminal identifier basis. In a second embodiment of the present invention, the TC-DB (10) is the one maintaining such relationship, whereas the Capability Repository (11) comprises the lists of capabilities on a per terminal identifier basis. Also under this second embodiment, the HLR/HSS is the only one maintaining the user profiles so that in case the TC-DB is directly queried from an application server about capabilities of the terminal a given user makes use of, such query done with a user identity other than the one linked to the terminal identifier under TC-DB premises, the TC-DB can always query the HLR/HSS about another user identity known to the TC-DB.

Notwithstanding this, the mechanism explained throughout this description, in terms of system, means and method, considers separate entities for the sake of clarity in respect of the different functions and means residing in said HLR/HSS and TC-DB.

The HLR/HSS then, and likely in cooperation with the TC-DB, links the terminal identifier to the relevant user identity of the user making use of such terminal equipment at that time. As referred above such link may as well be performed at the TC-DB without substantially modifying the scope of the invention. However, given that a user might make use of different user identities under different scenarios, the skilled person would find more advantageous that a relation between the terminal identifier and the user profile data resides at the HLR/HSS.

From now on and whilst the user makes use of such terminal equipment (30), the HLR/HSS (13), in co-operation with the TC-DB (10), is ready to provide any application server (20) with the terminal capabilities of a given user. Thus, the application server does not need to have any knowledge about terminal identities and their formats.

Consequently, when an application server (20) needs to perform a retrieval (S-3x) of terminal capabilities for a given user, a request message is sent (S-3x, S-4x) to the TC-DB, likely through the HLR/HSS (13) in charge of said user in the telecommunication network (1). The TC-DB searches in a list what is the terminal linked to said user at that time. Once the terminal identifier is found, it is used to get a list of the capabilities associated to that terminal. This list of capabilities can be found, for example, as a file in CC/PP format and stored either directly in the TC-DB, or alternatively in an external storage as the Capability Repository (11).

Generic signalling flows are shown in FIGS. 3, and 5 where the telecommunication network is a mobile network. The generic flow in FIG. 3 is applicable to Circuit and Packet domains, whereas FIG. 5 is rather oriented to $3^{rd}$ generation (3G) mobile systems provided with IP Mobility (IP-M). Particular explanations are given following this on a per domain basis, when relevant for a skilled person to understand aspects of the invention.

As shown in FIGS. 3, and 5, the mobile terminal (30), namely a Mobile Station (MS), provides (S-1x) its terminal identifier to the mobile network entry point. Said network entry point is a Mobile Switching Center (MSC) in a Circuit domain, or a Serving GPRS Support Node (SGSN) in a Packet domain, or a Call Status Control Function (CSCF) in a 3G mobile system with IP-M.

In particular and as shown in FIG. 3, the "Identity Request" operation may be used by an MSC (12) or an SGSN (12) to ask the terminal (30) for applicable terminal identifiers like, for example, the International Mobile Equipment Identity (IMEI). The MSC/SGSN (12) can initiate the identification procedure at any time by transferring an Identity Request message (S-11) to the mobile station (30) indicating the requested identifier within the "identity type" field. The mobile station sends back (S-12) to the network entry node (12) the terminal identity code, like the IMEI code for example, encapsulated in an "Identity Response" message. Such identity code is then stored in the MSC/SGSN (12) which forwards (S-21) it to the HLR/HSS. In accordance with an aspect of the present invention, this terminal identifier can be encapsulated in the Location Update message amended to this end.

A similar behaviour is proposed for IP Multimedia access in 3GPP as shown in FIG. 5, wherein the mobile station (30) sends (S-13) the terminal identity code at registration time, namely an IMEI or similar, by using a Register message towards a Serving CSCF (S-CSCF) where the received code is stored. The S-CSCF then forwards (S-21) this terminal identity code to the HLR/HSS through the 3GPP-standardized Cx Interface. Therefore, either a new signalling message is provided for, or an upgraded Cx-Put message is used.

The complete process has been somewhat simplified in FIG. 5 for the sake of clarity as anyone skilled in the art may appreciate. In fact, a negotiation and selection of said S-CSCF has been carried out from an Interrogating CSCF (I-CSCF) that forwards then the Register message to the selected S-CSCF.

From now on and as illustrated in FIGS. 3 and 5, an application server (20) can request (S-31), at any time, the terminal capabilities of the terminal currently in use by a given user by sending the user identity to the HLR/HSS. The HLR/HSS, after looking up the terminal identifier associated to said user, retrieves (S-41, S-42) the terminal capabilities from the TD-DB (10) and returns (S-32) the list of capabilities corresponding to the terminal back to the requester application server (20). The protocol used between HLR/HSS and the TC-DB could be Diameter, Lightweight Directory Access Protocol (LDAP), XML including Simple Object Access Protocol (SOAP), or whatever protocol allowing the transmission of terminal capabilities descriptions.

The solution can be applied as well to provide a centralised terminal capabilities database for those users accessing to services through an Internet Service Provider (ISP) as FIG. 2 illustrates. An ISP can check, bill and attend the user based on the username. A mechanism according to the invention, in terms of system, method and apparatus, thus allows the ISP to receive information about the capabilities of the terminal equipment used by a user by including additional information in existing messages used for Authentication, Authorisation and/or Accounting (hereinafter AAA) toward a corresponding server.

When a user provided with a terminal equipment (31) requests access (S-6x) to an ISP via a telecommunication network (1), as depicted in FIG. 2, the terminal identifier is sent to the network entry point (14) which forwards (S-7x) the terminal identifier to a telecommunication network database (15) where subscriber profiles reside. In particular, the network entry point (14) is a Network Access Server (NAS) for generic ISP users and the telecommunication network database is an Authentication, Authorization and Accounting (AAA) server, whereas for accessing via WLAN the network entry point (14) is a WLAN Support Node (WSN) and the telecommunication network database is a Home Subscriber Server (HSS).

Thus, as illustrated in FIG. 4, the terminal (31) makes use of existing access request operations to transmit (S-61, S-62) the terminal identification and/or model to a Network Access Server (NAS) (14). Then, the NAS transmits (S-71, S-72) the terminal identifier to the AAA-server (15), for instance by using extensions to the RADIUS and Diameter protocols. This new information may be included in whatever messages transmitted between the NAS (14) and the AAA-server (15). For example and as shown in FIG. 4, the terminal identifier has been included in the Access-Request message.

The AAA-server (15) under this embodiment behaves in a similar way as the HLR/HSS does in the preceding embodiments above. Such AAA-server (15) manages, in accordance with an aspect of the invention, the temporary relationship between the user profile and the terminal identifier of the terminal equipment currently in use by said user, whereas the TC-DB comprises the lists of terminal capabilities on per terminal identifier basis. Once more, in accordance with another embodiment of the invention, the TC-DB can be configured to comprise the relationship between particular user identity and terminal equipment identifier and thus receiving the related queries, whereas a co-operating Capability Repository (11) might be in charge of the lists of terminal capabilities on per terminal identifier basis.

In a currently preferred embodiment, an application server (20) may, at any time, request (S-81) the terminal capabilities of the terminal currently in use by a given user by sending the user identity to the AAA-server (15). The AAA-server, after looking up the terminal identifier associated to said user, retrieves (S-41, S-42) the terminal capabilities from the TD-DB (10) and returns (S82) the list of capabilities corresponding to the terminal back to the requester application server (20). The protocol used between AAA-server (15) and the TC-DB (10) could be also Diameter, LDAP, XML/SOAP or whatever protocol allowing to transmit terminal capabilities descriptions.

The solution is directly applicable to provide a centralised terminal database for the users acceding ISP through WLAN as FIG. 6 illustrates. The signalling flow under this scenario is similar to the one in FIG. 5 wherein a WLAN Support Node (WSN) is the network entry point (14), and a Home Subscriber Server (HSS) is the network database in charge of the temporary relationship between user profiles and terminal identifier, both WSN and HSS respectively performing similar procedures as the NAS and AAA in FIG. 5.

In a further embodiment of the invention not depicted in any drawing it is noticeable its use for a direct access from the terminal equipment without intermediate actuation of a network entry point (12, 14). In other words, an exemplary embodiment may be offered where a mobile terminal equipment takes the initiative of sending the terminal identifier to an HLR/HSS for example by means of an Unstructured Supplementary Service Data (USSD) message. Afterwards, and at any time, any application server may request the HLR/HSS about terminal capabilities associated to the given user identity, said terminal capabilities fetched from the TC-DB as in any of preceding preferred embodiments.

The invention is described above in respect of several embodiments in an illustrative and non-restrictive manner. The scope of the invention is determined by the claims, and any modification of the embodiments that fall within the scope of these claims is intended to be included therein.

The invention claimed is:

1. A method for providing capabilities of a first terminal equipment operated by a user, in a telecommunication network, to an application server intended for offering services to said user through such terminal equipment, comprises the steps of:
    storing in a storage of a telecommunication system network, capabilities of a plurality of terminal equipment, including capabilities of the first terminal equipment, the capabilities of each of the plurality of terminal equipment correlated with a terminal equipment identifier;
    establishing a temporary relationship between the user operating the first terminal equipment and the capabilities of the first terminal equipment;
    receiving in the telecommunication network from the first terminal equipment a user identity for the user operating the first terminal equipment and a terminal equipment identifier identifying the first terminal equipment;
    linking at an entity of the telecommunication network the received user identity with the received first terminal equipment identifier;
    requesting from an application server to the telecommunication network capabilities of the first terminal equipment currently in use by the user, wherein requesting capabilities includes referencing the user identity and not the terminal equipment identifier;
    obtaining from said entity the terminal equipment identifier linked with the user identity;
    fetching from storage the capabilities of the first terminal equipment correlated with the first terminal equipment identifier; and
    providing the capabilities of the first terminal equipment currently in use by the given user, from the telecommunication network to the application server.

2. The method in claim 1, wherein the step of receiving the user identity and the terminal equipment identifier involves an entry node to the telecommunication network, the entry node receiving and transferring the terminal equipment identifier and the user identity sent from the terminal equipment.

3. The method in claim 2, wherein the entry node to the telecommunication network is a Mobile Switching Center (MSC) or a Serving GPRS Support Node (SGSN).

4. The method in claim 3, wherein the terminal equipment identifier and the user identity are both included in an Update Location message.

5. The method in claim 2, wherein the entry node to the telecommunication network is a Call Status Control Function (CSCF).

6. The method in claim 5, wherein the terminal equipment identifier and the user identity are both included in an Cx-put message.

7. The method in claim 2, wherein the entry node to the telecommunication network is a Network Access Server (NAS) or a WLAN Support Node (WSN).

8. The method in claim 7, wherein the terminal equipment identifier and the user identity are both included in a message intended for Access Request.

9. The method in claim 1, wherein the entity linking the received user identity with the received terminal equipment identifier is an entity holding user profile data for users of the telecommunication network.

10. The method in claim 9, wherein the entity holding user profile data and receiving the terminal equipment identifier and the user identity is a Home Location Register (HLR) or a Home Subscriber Server (HSS).

11. The method in claim 9, wherein the entity holding user profile data and receiving the terminal equipment identifier and the user identity is an Authentication Authorization and Accounting (AAA) server.

12. The method in claim 1, wherein the step of linking at an entity includes linking user profile data, user identity and terminal equipment identifier.

13. The method in claim 12, wherein user profile data, user identity and terminal equipment identifier are linked on a per user basis in a Home Location Register (HLR), or in a Home Subscriber Server (HSS), or in an Authentication Authorization and Accounting (AAA) server.

14. The method in claim 1, wherein the terminal capabilities are stored in a terminal Capabilities Database and correlated therein with corresponding terminal equipment identifiers.

15. The method in claim 1, wherein the terminal capabilities are stored in a storage accessible to a Terminal Capabilities Database and correlated therein with a terminal equipment identifier.

16. The method according to claim 1, wherein an International Mobile Equipment Identity (IMEI) is used as a terminal equipment identifier.

17. The method according to claim 1, wherein a terminal descriptor based on Composite Capability Preference Profiles (CC/PP) or in User Agent Profile (UAProf) is used as a terminal equipment identifier.

18. A telecommunication system for providing capabilities of a first terminal operated by a user to an application server intended for offering services to said user through such terminal equipment, comprising:
    a terminal capabilities database for storing capabilities of a plurality of terminal equipment, including capabilities of the first terminal equipment, the capabilities of each of the plurality of terminal equipment correlated with a corresponding terminal equipment identifier;
    one or more nodes in the telecommunication system for:
        establishing a temporary relationship between the user operating the first terminal equipment and the capabilities of the first terminal equipment;
        receiving from the first terminal equipment, a user identity for the user operating the first terminal equipment, and a terminal equipment identifier identifying the first terminal equipment;
        linking the received user identity with the received terminal equipment identifier;
        receiving a request from an application server for capabilities of the first terminal equipment currently in use by the user, wherein requesting capabilities includes referencing the user identity and not the terminal equipment identifier;

obtaining the terminal equipment identifier linked with the user identity;

fetching from storage the capabilities of the first terminal equipment corresponding to the received terminal equipment identifier; and providing the capabilities of the first terminal equipment currently in use by the user to the application server.

19. The telecommunication system in claim 18, wherein the means for linking the received user identity with the received terminal equipment identifier includes means for linking user profile data, user identity and terminal equipment identifier at an entity holding user profile data in the telecommunication system.

20. The telecommunication system in claim 19, wherein user data profile, user identity and terminal equipment identifier are linked on a per user basis in a Home Location Register (HLR), or in a Home Subscriber Server (HSS), or in an Authentication Authorization and Accounting (AAA) server.

21. The telecommunication system in claim 18, wherein the entity linking the received user identity with the received terminal equipment identifier is an entity holding user profile data for users of the telecommunication system.

22. The telecommunication system in claim 18, wherein the terminal capabilities are stored in a storage accessible to a Terminal Capabilities Database and correlated therein with the terminal equipment identifier.

23. The telecommunication system in claim 18, wherein the user identity and the corresponding terminal equipment identifier are both included in an Update Location message.

24. The telecommunication system in claim 18, wherein the user identity and the corresponding terminal equipment identifier are both included in a Cx-put message.

25. The telecommunication system in claim 18, wherein the means for receiving includes an entry node to the telecommunication system, the entry node receiving and transferring the corresponding terminal equipment identifier and the user identity sent from the first terminal equipment.

26. The telecommunication system in claim 18, wherein at least one entity selected from an Authentication Authorization and Accounting (AAA) server, a Home Location Register (HLR), a Home Subscriber Server (HSS), and a Terminal Capabilities Database includes the means for providing a list of terminal capabilities of the first terminal equipment at request from an application server providing the user identity of the user operating said first terminal equipment.

27. The telecommunication system in claim 18, wherein an International Mobile Equipment Identity (IMEI) is used as the first terminal equipment identifier.

28. The telecommunication system according to claim 18, wherein a terminal descriptor based on Composite Capability Preference Profiles (CC/PP) or in User Agent Profile (UA-Prof) is used as the first terminal equipment identifier.

29. An entity of a telecommunication system for providing capabilities of a first terminal equipment operated by a user to an application server intended for offering services to said user through such terminal equipment, the entity comprising:

a terminal capabilities database for receiving a user identity for a user operating the first terminal equipment and a terminal equipment identifier identifying the first terminal equipment from an entry node of the telecommunication system;

one or more nodes connected to the entity of the telecommunication system for:

linking the received user identity with the received terminal equipment identifier;

establishing a temporary relationship between the user operating the first terminal equipment and the capabilities of said terminal equipment;

receiving a request originated from an application server for the capabilities of the first terminal equipment currently in use by the user, wherein the request for capabilities references the user identity and not the terminal equipment identifier;

fetching from a storage those capabilities corresponding to the terminal equipment identifier linked with the user identity; and providing to the application server the capabilities of the first terminal equipment identified by the terminal equipment identifier.

30. The entity of claim 29 further comprising user profile data for users of the telecommunication system.

31. The entity of claim 30 further comprising means for obtaining user identities other than the user and included in the user profile data for the user, said other user identity linked with a second terminal equipment identifier.

\* \* \* \* \*